US012729832B1

(12) United States Patent
Ji

(10) Patent No.: US 12,729,832 B1
(45) Date of Patent: Sep. 8, 2026

(54) PROJECTION LAMP STRUCTURE HAVING SPACEMAN MODEL

(71) Applicant: Zhongshan Yong Qi Electronic Co., Ltd., Zhongshan (CN)

(72) Inventor: Shaoqi Ji, Zhongshan (CN)

(73) Assignees: ZHONGSHAN YONG QI ELECTRONIC CO., LTD., Zhongshan (CN); SHENZHEN ANDELIAN TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/206,100

(22) Filed: May 13, 2025

(51) Int. Cl.
*F21V 14/06* (2006.01)
*F21V 5/04* (2006.01)
(Continued)

(52) U.S. Cl.
CPC ................ *F21V 14/06* (2013.01); *F21V 5/04* (2013.01); *F21V 11/00* (2013.01); *F21V 15/01* (2013.01);
(Continued)

(58) Field of Classification Search
CPC .......... F21S 10/007; F21V 14/06; F21V 5/04; F21V 11/00; F21V 15/01; F21V 17/105; F21V 23/003; A63H 3/006
See application file for complete search history.

(56) References Cited

U.S. PATENT DOCUMENTS 3,531,890 A * 10/1970 Manning ................ A63H 13/10 335/90
6,699,094 B1 * 3/2004 Ward ..................... A63H 3/006 446/376
(Continued)

FOREIGN PATENT DOCUMENTS

| | | | |
|---|---|---|---|
| CN | 216485948 U | * | 5/2022 |
| CN | 221444086 U | * | 7/2024 |

OTHER PUBLICATIONS

Cayclay, Astronaut Galaxy Projector, Star Projector with Timer and Remote, Night Light with Moon Lamp, LED Nebula Lamp for Kids Adults, Room Decor Gift (White), https://www.amazon.com/Cayclay-Astronaut-Projector-Galaxy-Bedroom/dp/BOBVG58SN8?th=1, Nov. 12, 2022 (Year: 2022).*
(Continued)

*Primary Examiner* — James R Greece
*Assistant Examiner* — Michael Chiang
(74) *Attorney, Agent, or Firm* — HOWARD M COHN and Associates, LLC

(57) ABSTRACT

Disclosed is a projection lamp structure having a spaceman model, including a spaceman body structure, a spaceman head structure, and spaceman hand structures. The spaceman head structure is installed at a top of the spaceman body structure, and the spaceman hand structures are installed on both sides of the spaceman body structure. The spaceman head structure includes a head housing. A projector mechanism is arranged inside the head housing. A night lamp mechanism is arranged inside the spaceman body structure. By arranging the spaceman body structure, the spaceman head structure, and the spaceman hand structures to jointly form the spaceman model, the projection lamp structure not only has a more interesting appearance, but also is larger in internal space. The projection lamp structure can integrate various functions such as projection, night lamp, laser, and horn, is higher in practicality, and can meet more diversified requirements.

19 Claims, 6 Drawing Sheets

(51) Int. Cl.

| | |
|---|---|
| ***F21V 11/00*** | (2015.01) |
| ***F21V 15/01*** | (2006.01) |
| ***F21V 17/10*** | (2006.01) |
| ***F21V 23/00*** | (2015.01) |
| ***F21V 23/04*** | (2006.01) |

(52) U.S. Cl.

CPC .......... *F21V 17/105* (2013.01); *F21V 23/003* (2013.01); *F21V 23/04* (2013.01)

(56) References Cited

U.S. PATENT DOCUMENTS

| | | | | |
|---|---|---|---|---|
| 11,906,136 | B1 * | 2/2024 | Pang | F21V 5/008 |
| D1,037,539 | S * | 7/2024 | Jin | D26/104 |
| 12,098,812 | B1 * | 9/2024 | Li | F21V 14/06 |
| D1,077,334 | S * | 5/2025 | Zhong | D26/93 |
| 2015/0147932 | A1 * | 5/2015 | Vizcarra | G03B 21/145<br>446/72 |
| 2016/0209013 | A1 * | 7/2016 | Chien | F21V 14/02 |
| 2018/0099226 | A1 * | 4/2018 | Villano | F21V 1/146 |
| 2019/0038987 | A1 * | 2/2019 | Smith | A63H 33/08 |
| 2021/0164628 | A1 * | 6/2021 | Zheng | F21S 10/002 |
| 2024/0181367 | A1 * | 6/2024 | Hunt | A63H 3/28 |
| 2025/0084973 | A1 * | 3/2025 | Zhang | F21V 14/02 |

OTHER PUBLICATIONS

Cayclay, Astronaut Galaxy Projector, Star Projector with Timer and Remote, Night Light with Moon Lamp, LED Nebula Lamp for Kids Adults, Room Decor Gift (White), https://www.amazon.com/Cayclay-Astronaut-Projector-Galaxy-Bedroom/dp/B0BVG58SN8?th=1, Nov. 12, 2022 (Year: 2022).*

* cited by examiner

PROJECTION LAMP STRUCTURE HAVING SPACEMAN MODEL

TECHNICAL FIELD

The present disclosure relates to the technical field of projection lamps, and in particular to a projection lamp structure having a spaceman model.

BACKGROUND

In recent years, projection lamps have been widely applied to places such as building contours, stadiums, parks, and flower beds to project rays to a surrounding environment, so as to play an illuminating role. The projection lamps can further play a role of beautifying the environment by changing a shape and pattern of the projected rays. However, existing projection lamps are relatively single in structure, and usually include lamp bodies, lamp holders, and electrical components. The lamp bodies are simply and rotatably arranged on the lamp holders to facilitate adjustment of projecting angles. The existing projection lamps have few functions and are short of interestingness.

SUMMARY

To overcome deficiencies in the prior art, the present disclosure aims to provide a projection lamp structure having a spaceman model.

In order to achieve the above object, the present disclosure adopts the following technical solution:

A projection lamp structure having a spaceman model, including a spaceman body structure, a spaceman head structure, and spaceman hand structures, where the spaceman head structure is installed at a top of the spaceman body structure, and the spaceman hand structures are installed on both sides of the spaceman body structure;

the spaceman head structure includes a head housing, a projector mechanism is arranged inside the head housing, and the projector mechanism includes a spherical lens, a patterned lens, and a projection lamp panel; the spherical lens is located in front of the patterned lens, and the projection lamp panel is located behind the patterned lens and a direction where a ray is emitted faces the patterned lens; corresponding protrusions are manufactured in advance on an exit surface of the patterned lens according to a pattern to be projected; and the projection lamp panel is connected to a control circuit board, the control circuit board is connected with a projection control button, the projection control button is configured to input a projection control instruction to the control circuit board, and the control circuit board drives the projection lamp panel to be turned on or off according to the projection control instruction; and a night lamp mechanism is arranged inside the spaceman body structure, the night lamp mechanism is connected to the control circuit board, the control circuit board is connected with a night lamp control button, the night lamp control button is configured to input a night lamp control instruction to the control circuit board, and the control circuit board controls the night lamp mechanism to be turned on or off according to the night lamp control instruction; and a night lamp ray outlet is formed in a front surface of the spaceman body structure, an exit portal of the night lamp mechanism corresponds to the night lamp ray outlet, and a transparent lampshade is arranged in front of the night lamp ray outlet.

Further, the projector mechanism further includes a motor, and the motor is in transmission connection to the patterned lens and can drive the patterned lens to rotate axially; and the motor is connected to the control circuit board, the control circuit board is connected with a motor control button, the motor control button is configured to input a motor control instruction to the control circuit board, and the control circuit board controls the motor to be started or stopped according to the motor control instruction.

Further, the transparent lampshade is in a lunar shape.

Further, a horn is further arranged in the head housing, the horn is connected to the control circuit board, the control circuit board is connected with a horn control button, the horn control button is configured to input a horn control instruction to the control circuit board, and the control circuit board controls the horn to be turned on and off or adjusts a volume according to the horn control instruction.

Further, the head housing includes a front housing, a back housing, a left ear muff, a right ear muff, and a transparent mask; the front housing and the back housing are connected, the left ear muff and the right ear muff are respectively arranged on left and right sides of a whole obtained by connecting the front housing and the back housing, the front housing has a mask installation hole, and the transparent mask is fixedly installed in the mask installation hole; and a sound hole is formed in a back surface of the back housing, and a sound surface of a horn faces the back housing.

Further, a laser exit hole is formed in an upper portion of a front surface of the head housing, a laser module is further arranged in the head housing, and the laser module is installed in the laser exit hole and an exit surface faces forward; and the laser module is electrically connected to the control circuit board, the control circuit board is connected with a laser control button, the laser control button is configured to send a laser control instruction to the control circuit board, and the control circuit board controls the laser module to be turned on or off according to the laser control instruction.

Further, a head fixing seat is fixedly arranged at the top of the spaceman body structure, a magnet is arranged on the head fixing seat, an iron sheet is fixedly arranged at a bottom of the head housing, and the head housing is connected to the top of the spaceman body structure via an adsorption force between the iron sheet and the magnet.

Further, a backpack-shaped housing is arranged on a back surface of the spaceman body structure, the control circuit board is arranged inside the backpack-shaped housing, and all the control buttons are integrated on a button board and are installed on a back surface of the backpack-shaped housing.

Further, the night lamp mechanism includes a hollow night lamp bracket and a night lamp panel fixed inside the night lamp bracket, a back end of the night lamp bracket is connected with an interior of a backpack-shaped housing, and a front end of the night lamp bracket is connected with the night lamp ray outlet.

Further, the exit surface of the patterned lens is filled with a plurality of hexahedral protrusions, and all the hexahedral protrusions are consecutively and tightly arranged.

The present disclosure has the following beneficial effects: by arranging the spaceman body structure, the spaceman head structure, and the spaceman hand structures to jointly form the spaceman model, the projection lamp structure disclosed by the present disclosure not only has a more interesting appearance, but also is larger in internal space. The projection lamp structure can integrate various functions such as projection, night lamp, laser, and horn, is higher in practicality, and can meet more diversified requirements.

DETAILED DESCRIPTION

Figure 1:
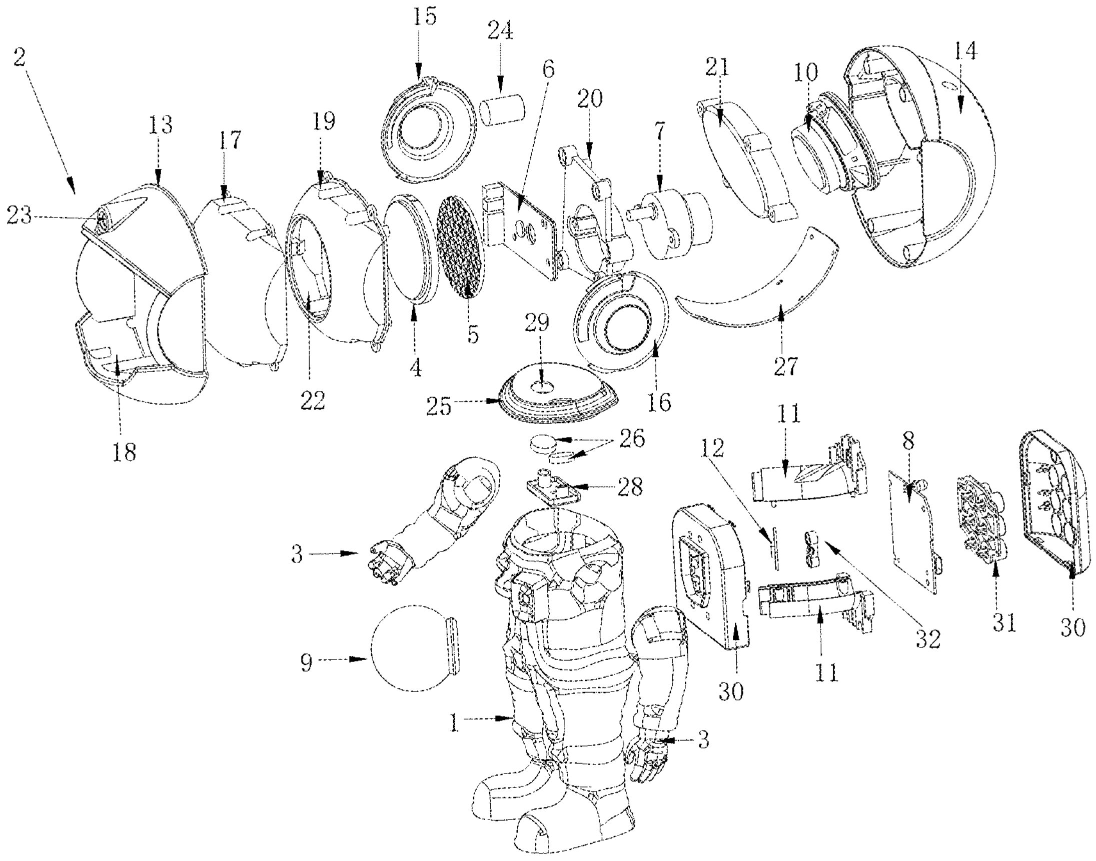
FIG. 1 is a schematic exploded view of a projection lamp structure in an embodiment of the present disclosure.

The present disclosure will be further described below in combination with accompanying drawings. It is to be noted that based on the premise of the technical solution, the present disclosure provides detailed embodiments and specific operating processes. But the protection scope of the present disclosure is not limited to the embodiments.

The embodiment provides a projection lamp structure having a spaceman model, as shown in FIGS. 1-6, including a spaceman body structure 1, a spaceman head structure 2, and spaceman hand structures 3, where the spaceman head structure 2 is installed at a top of the spaceman body structure 1, and the spaceman hand structures 3 are installed on both sides of the spaceman body structure 1, and the spaceman body structure 1, the spaceman head structure 2, and the spaceman hand structures 3 jointly form an appearance of a spaceman model; and the spaceman head structure 1 includes a head housing, a projector mechanism is arranged inside the head housing, and the projector mechanism includes a spherical lens 4, a patterned lens 5, a projection lamp panel 6, and a motor 7; the spherical lens 4 is located in front of the patterned lens 5, and the projection lamp panel 6 is located behind the patterned lens 5 and a direction where a ray is emitted faces the patterned lens 5; the motor 7 is in transmission connection to the patterned lens 5 and can drive the patterned lens 5 to rotate axially; corresponding protrusions are manufactured in advance on an exit surface of the patterned lens 5 according to a pattern to be projected; and the projection lamp panel 6 and the motor 7 are connected to a control circuit board 8, the control circuit board 8 is connected with a projection control button and a motor control button, the projection control button and the motor control button are configured to input a projection control instruction and a motor control instruction to the control circuit board 8, and the control circuit board 8 drives the projection lamp panel 6 to be turned on or off according to the projection control instruction and controls the motor 7 to be started or stopped according to the motor control instruction.

During use, a projection starting instruction is inputted to the control circuit board through the corresponding projection control button, and the control circuit board delivers a driving signal to the projection lamp panel to drive the projection lamp panel to be started. In this case, the projection lamp panel emits a ray, and passing through the patterned lens, the ray aligned by the spherical lens projects a predetermined pattern. When a motor starting instruction is inputted to the control circuit board through the corresponding motor control button, the control circuit board delivers a driving signal to the motor to drive the motor to be started. The motor drives the patterned lens to rotate axially, and in this case, the projected pattern is dynamic.

Figure 2:
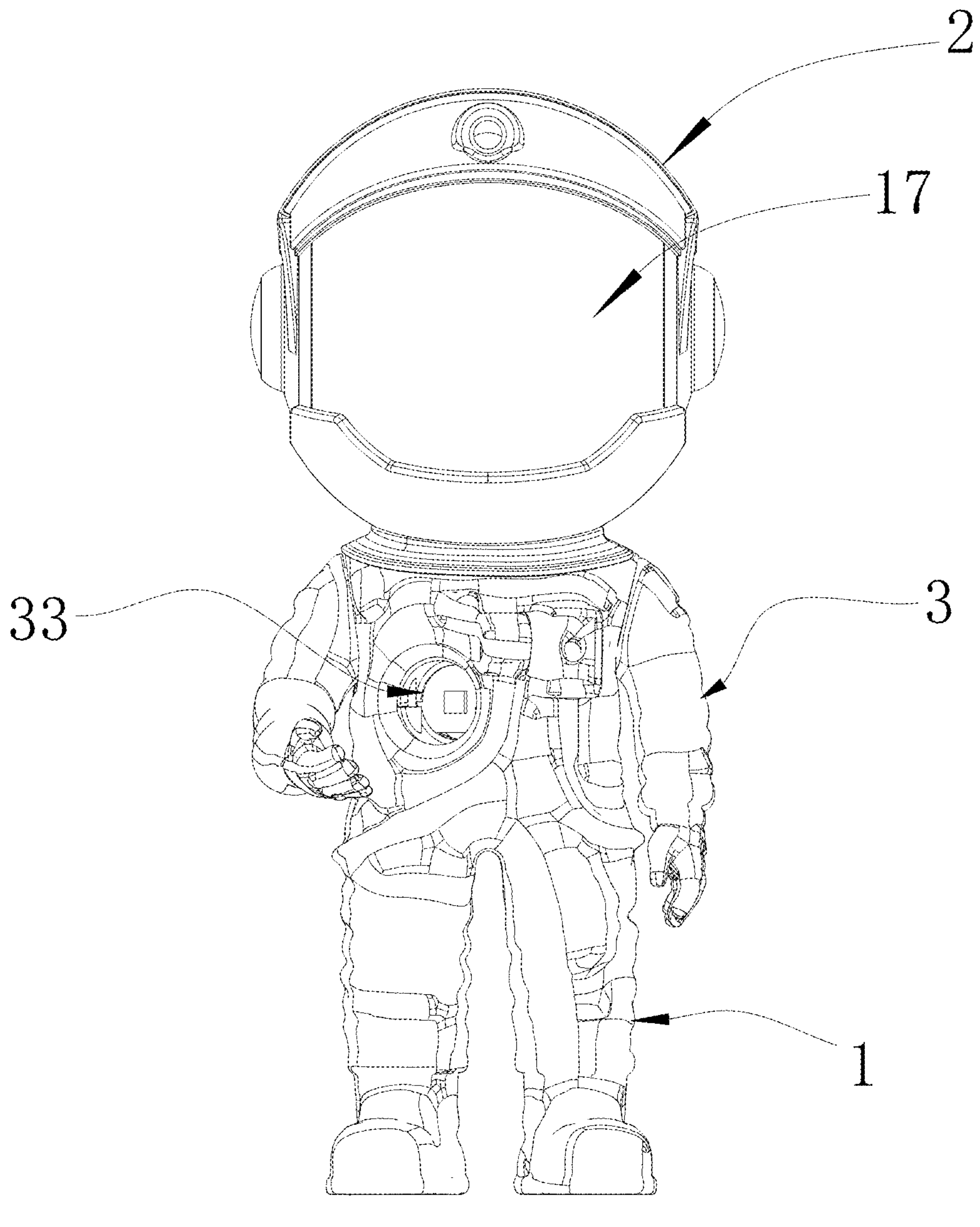
FIG. 2 is a frontal schematic diagram of the projection lamp structure in an embodiment of the present disclosure without a transparent lampshade.
Figure 3:
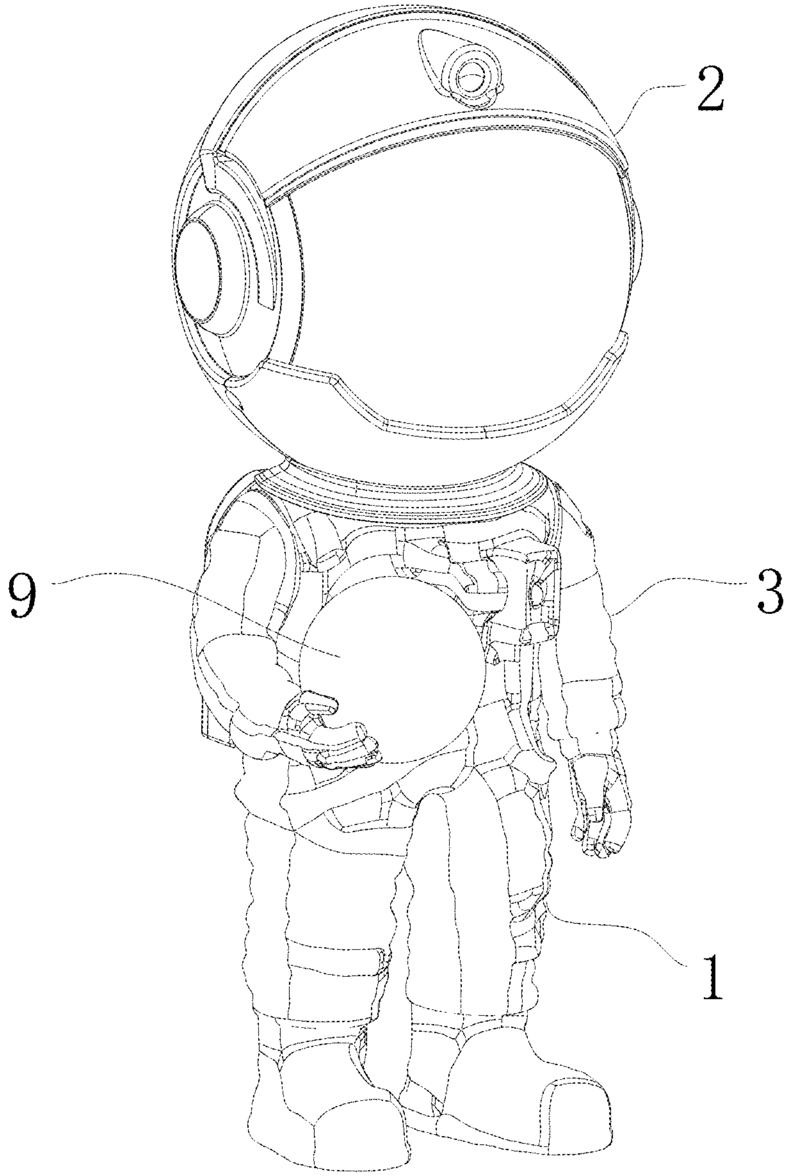
FIG. 3 is a three-dimensional schematic diagram of the projection lamp structure in an embodiment of the present disclosure in a front view.
Figure 4:
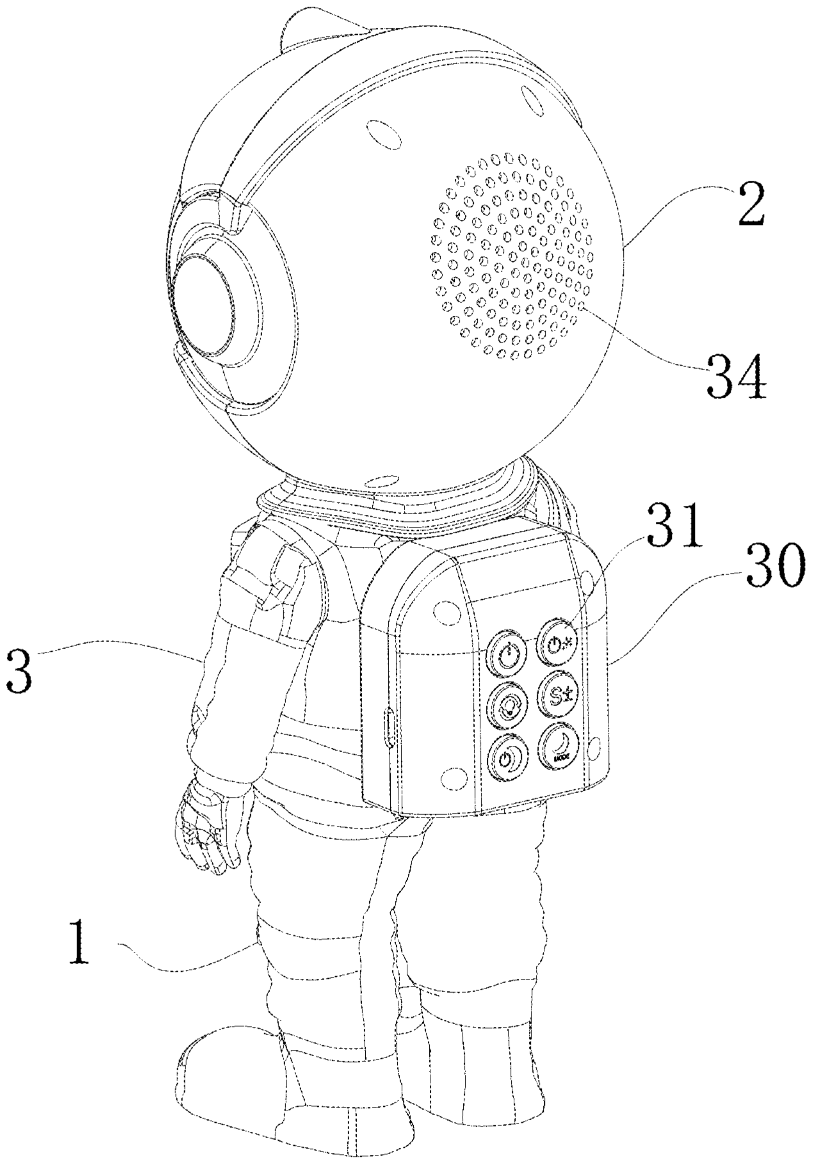
FIG. 4 is a three-dimensional schematic diagram of the projection lamp structure in an embodiment of the present disclosure in a back view.

In the embodiment, as shown in FIG. 2, a night lamp mechanism is arranged inside the spaceman body structure 1, the night lamp mechanism is connected to the control circuit board 8, the control circuit board 8 is connected with a night lamp control button, the night lamp control button is configured to input a night lamp control instruction to the control circuit board 8, and the control circuit board 8 controls the night lamp mechanism to be turned on or off according to the night lamp control instruction; and a night lamp ray outlet 33 is formed in a front surface of the spaceman body structure 1, an exit portal of the night lamp mechanism corresponds to the night lamp ray outlet 33, and a transparent lampshade 9 is arranged in front of the night lamp ray outlet 33. To better match the spaceman model, the transparent lampshade 9 in the embodiment is in a lunar shape.

When a night lamp function is needed, the night lamp control instruction is inputted to the control circuit board through the corresponding night lamp control button, the control circuit board controls the night lamp mechanism to be turned on according to the night lamp control instruction, and the ray emitted by the night lamp mechanism is emitted from the night lamp ray outlet and the transparent lampshade successively.

It is to be noted that the projector mechanism and the night lamp mechanism each have an illuminating effect, but the projector mechanism puts more emphasis on a decorative effect.

In the embodiment, a horn 10 is further arranged in the spaceman head structure 2, the horn 10 is connected to the control circuit board 8, the control circuit board 8 is connected with a horn control button, the horn control button is configured to input a horn control instruction to the control circuit board 8, and the control circuit board controls the horn 10 to be turned on and off or adjusts a volume according to the horn control instruction. By using the horn, the projection lamp structure further has a play function, and a play program can be preset in the control circuit board to play various sound contents such as advertisements, warnings, and welcome speeches.

In the embodiment, the head housing includes a front housing 13, a back housing 14, a left ear muff 15, a right ear muff 16, and a transparent mask 17; the front housing 13 and the back housing 14 are connected, the left ear muff 15 and the right ear muff 16 are respectively arranged on left and right sides of a whole obtained by connecting the front housing 13 and the back housing 14, the front housing 13 has a mask installation hole 18, and the transparent mask 17 is fixedly installed in the mask installation hole 18; and a sound hole 34 is formed in a back surface of the back housing 14, and a sound surface of the horn 10 faces the back housing 14; and the front housing 13, the back housing 14, the left ear muff 15, the right ear muff 16, and the transparent mask 17 jointly form an appearance of a spaceman helmet.

More specifically, a lens bracket 19, a motor bracket 20, and a horn cover 21 are arranged inside the head housing; a lens installation hole 22 is formed in a front surface of the lens bracket 19, and the spherical lens 4 is fixedly installed in the lens installation hole 22; and the motor 7 and the horn 10 are respectively fixed inside the head housing through the motor bracket 20 and the horn cover 21.

In the embodiment, a laser exit hole 23 is formed in an upper portion of a front surface of the head housing, a laser module 24 is further arranged in the head housing, and the laser module 24 is installed in the laser exit hole 23 and an exit surface faces forward; and the laser module 24 is electrically connected to the control circuit board 8, the control circuit board 8 is connected with a laser control button, the laser control button is configured to send a laser control instruction to the control circuit board 8, and the control circuit board 8 controls the laser module 24 to be turned on or off according to the laser control instruction.

In the embodiment, a head fixing seat 25 is fixedly arranged at the top of the spaceman body structure 1, a magnet 26 is arranged on the head fixing seat 25, an iron sheet 27 is fixedly arranged at a bottom of the head housing, and the head housing is connected to the top of the spaceman body structure 1 via an adsorption force between the iron sheet 27 and the magnet 26.

More specifically, a magnetic pressing plate 28 is arranged inside the spaceman body structure 1, and the magnet 27 is fixedly supported on the magnetic pressing plate 28; and a magnet installation hole 29 is formed in the head fixing seat 25, and the magnet 26 is embedded into the magnet installation hole 29.

More specifically, the head fixing seat 25 and the iron sheet 27 are of cambered structures matching each other.

In the embodiment, the spaceman hand structure 3 is rotatably connected to the spaceman body structure 1.

In the embodiment, a backpack-shaped housing 30 is arranged on a back surface of the spaceman body structure 1, the control circuit board 8 is arranged inside the backpack-shaped housing 30, and the projection control button, the motor control button, the night lamp control button, the horn control button, and the laser control button are integrated on a button board 31 and are installed on a back surface of the backpack-shaped housing 30.

Figure 5:
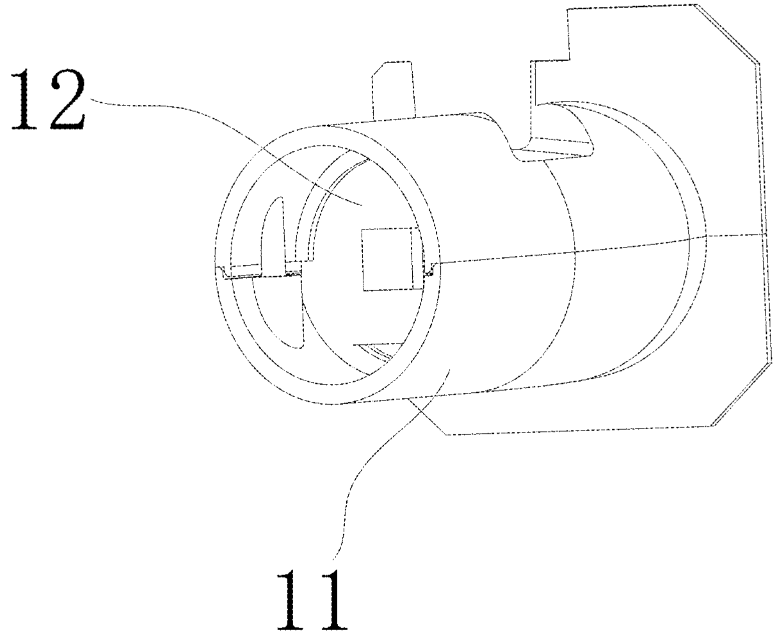
FIG. 5 is an overall schematic diagram of a structure of a night lamp mechanism in an embodiment of the present disclosure.

Specifically, in the embodiment, as shown in FIG. 5, the night lamp mechanism includes a hollow night lamp bracket 11 and a night lamp panel 12 fixed inside the night lamp bracket 11, a back end of the night lamp bracket 11 is connected with an interior of the backpack-shaped housing 30 to facilitate a connection between the night lamp panel 12 and the control circuit board 8, and a front end of the night lamp bracket 11 is connected with the night lamp ray outlet 33.

Specifically, in the embodiment, a wire ramp 32 is further arranged in the night lamp bracket 11 to fix a connecting line between the night lamp panel and the control circuit board.

Figure 6:
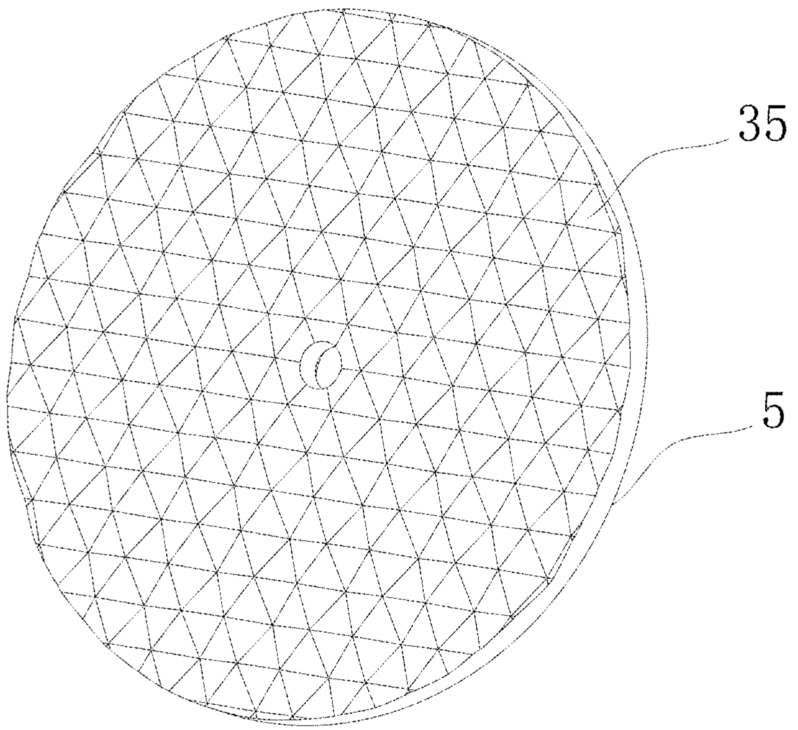
FIG. 6 is an overall schematic diagram of a patterned lens in an embodiment of the present disclosure.

In the embodiment, as shown in FIG. 6, the exit surface of the patterned lens 5 is filled with a plurality of hexahedral protrusions 51, and all the hexahedral protrusions 51 are consecutively and tightly arranged. When passing through the patterned lens 5 and aligned by the spherical lens, the ray will project a water wave-shaped pattern.

Persons of ordinary skill in the art can make various corresponding changes and transformations according to the above technical solution and concept, and all the changes and transformations shall fall within the protection scope of the claims of the present disclosure.

What is claimed is:

1. A projection lamp structure having a spaceman model, comprising a spaceman body structure, a spaceman head structure, and spaceman hand structures, wherein the spaceman head structure is installed at a top of the spaceman body structure, and the spaceman hand structures are installed on both sides of the spaceman body structure;

the spaceman head structure comprises a head housing, a projector mechanism is arranged inside the head housing, and the projector mechanism comprises a spherical lens, a patterned lens, and a projection lamp panel; the spherical lens is located in front of the patterned lens, and the projection lamp panel is located behind the patterned lens and a direction where a ray is emitted faces the patterned lens; corresponding protrusions are manufactured in advance on an exit surface of the patterned lens according to a pattern to be projected; and the projection lamp panel is connected to a control circuit board, the control circuit board is connected with a projection control button, the projection control button is configured to input a projection control instruction to the control circuit board, and the control circuit board drives the projection lamp panel to be turned on or off according to the projection control instruction;

wherein a head fixing seat is fixedly arranged at the top of the spaceman body structure, a magnet is arranged on the head fixing seat, an iron sheet is fixedly arranged at a bottom of the head housing, and the head housing is connected to the top of the spaceman body structure via an adsorption force between the iron sheet and the magnet; and wherein the head fixing seat and the iron sheet are of cambered structures matching each other, and a magnet installation hole is formed in the head fixing seat, the magnet is embedded into the magnet installation hole, and a pressing plate is provided in the spaceman body structure to fix the magnet.

2. The projection lamp according to claim 1, wherein the projector mechanism further comprises a motor, and the motor is in transmission connection to the patterned lens and can drive the patterned lens to rotate axially; and the motor is connected to the control circuit board, the control circuit board is connected with a motor control button, the motor control button is configured to input a motor control instruction to the control circuit board, and the control circuit board controls the motor to be started or stopped according to the motor control instruction.

3. The projection lamp structure according to claim 1, wherein a night lamp mechanism is arranged inside the spaceman body structure, a night lamp ray outlet is formed in a front surface of the spaceman body structure, a transparent lampshade is arranged in front of the night lamp ray outlet, and the transparent lampshade is in a lunar shape and in contact with one of the spaceman hand structures.

4. The projection lamp structure having a spaceman model according to claim 1, wherein a horn is further arranged in the head housing, the horn is connected to the control circuit board, the control circuit board is connected with a horn control button, the horn control button is configured to input a horn control instruction to the control circuit board, and the control circuit board controls the horn to be turned on and off or adjusts a volume according to the horn control instruction.

5. The projection lamp structure having a spaceman model according to claim 1, wherein the head housing further comprises a front housing, a back housing, a left ear muff, and a right ear muff, and a transparent mask; the front housing and the back housing are connected, the left ear muff and the right ear muff are respectively arranged on left and right sides of a whole obtained by connecting the front housing and the back housing, the front housing has a mask installation hole, and the transparent mask is fixedly installed in the mask installation hole; and a sound hole is formed in a back surface of the back housing, and a sound surface of a horn faces the back housing.

6. The projection lamp structure having a spaceman model according to claim 1, wherein a head fixing seat is fixedly arranged at the top of the spaceman body structure, a magnet is arranged on the head fixing seat, an iron sheet is fixedly arranged at a bottom of the head housing, and the head housing is connected to the top of the spaceman body structure via an adsorption force between the iron sheet and the magnet.

7. The projection lamp structure having a spaceman model according to claim 1, wherein a backpack-shaped housing is arranged on a back surface of the spaceman body structure, the control circuit board is arranged inside the backpack-shaped housing, and all the control buttons are integrated on a button board and are installed on a back surface of the backpack-shaped housing.

8. The projection lamp structure having a spaceman model according to claim 1, wherein a night lamp mechanism is arranged inside the spaceman body structure, a night lamp ray outlet is formed in a front surface of the spaceman body structure; the night lamp mechanism comprises a hollow night lamp bracket and a night lamp panel fixed inside the night lamp bracket, a back end of the night lamp bracket is connected with an interior of a backpack-shaped housing, and a front end of the night lamp bracket is connected with the night lamp ray outlet.

9. The projection lamp structure having a spaceman model according to claim 8, wherein a wire ramp is further arranged in the night lamp bracket to fix a connecting line between the night lamp panel and the control circuit board.

10. The projection lamp structure having a spaceman model according to claim 1, wherein the exit surface of the patterned lens is filled with a plurality of hexahedral protrusions, and all the hexahedral protrusions are consecutively and tightly arranged.

11. The projection lamp structure having a spaceman model according to claim 1, wherein the magnet is fixedly supported on the pressing plate.

12. The projection lamp structure having a spaceman model according to claim 1, wherein a night lamp mechanism is arranged inside the spaceman body structure, the night lamp mechanism is connected to the control circuit board, the control circuit board is connected with a night lamp control button, the night lamp control button is configured to input a night lamp control instruction to the control circuit board, and the control circuit board controls the night lamp mechanism to be turned on or off according to the night lamp control instruction; and a night lamp ray outlet is formed in a front surface of the spaceman body structure, an exit portal of the night lamp mechanism corresponds to the night lamp ray outlet, and a transparent lampshade is arranged in front of the night lamp ray outlet;

wherein the transparent lampshade is held by only one of the spaceman hand structures.

13. The projection lamp structure having a spaceman model according to claim 1, wherein a laser exit hole is formed in an upper portion of a front surface of the head housing, a laser module is further arranged in the head housing, and the laser module is installed in the laser exit hole and an exit surface faces forward; and the laser module is electrically connected to the control circuit board, the control circuit board is connected with a laser control button, the laser control button is configured to send a laser control instruction to the control circuit board, and the control circuit board controls the laser module to be turned on or off according to the laser control instruction; and wherein a lens bracket is arranged inside the head housing for holding the spherical lens, and the head housing comprises a transparent mask arranged in front of the lens bracket and exposed to outside, the projector mechanism generates a projected pattern, and the projected pattern is transmitted outside through the transparent mask; the laser exit hole is arranged substantially at a central position above the transparent mask.

14. A projection lamp structure having a standing spaceman model, comprising a standing spaceman body structure, a spaceman head structure, and spaceman hand structures, wherein the spaceman head structure is installed at a top of the spaceman body structure, and the spaceman hand structures are installed on both sides of the spaceman body structure;

the spaceman head structure comprises a head housing, a projector mechanism is arranged inside the head housing, and the projector mechanism comprises a spherical lens, a patterned lens, and a projection lamp panel; the spherical lens is located in front of the patterned lens, and the projection lamp panel is located behind the patterned lens and a direction where a ray is emitted faces the patterned lens; corresponding protrusions are manufactured in advance on an exit surface of the patterned lens according to a pattern to be projected; and the projection lamp panel is connected to a control circuit board, the control circuit board is connected with a projection control button, the projection control button is configured to input a projection control instruction to the control circuit board, and the control circuit board drives the projection lamp panel to be turned on or off according to the projection control instruction;

wherein a lens bracket is arranged inside the head housing for holding the spherical lens, and the head housing comprises a transparent mask arranged in front of the lens bracket, the projector mechanism generates a projected pattern, and the projected pattern is transmitted outside through the transparent mask;

wherein a head fixing seat is fixedly arranged at the top of the spaceman body structure, a magnet is arranged on the head fixing seat, an iron sheet is fixedly arranged at a bottom of the head housing, and the head housing is connected to the top of the spaceman body structure via an adsorption force between the iron sheet and the magnet; and wherein the head fixing seat and the iron sheet are of cambered structures matching each other, and a magnet installation hole is formed in the head fixing seat, the magnet is embedded into the magnet installation hole, and a supporting plate is provided in the spaceman body structure to fix the magnet.

15. The projection lamp structure having a spaceman model according to claim 14, wherein a horn is further arranged in the head housing, and the head housing further comprises a front housing and a back housing, the transparent mask is arranged in the front housing, and the back housing is provided with sound holes for transmitting out sound of the horn.

16. The projection lamp structure having a spaceman model according to claim 14, wherein the spaceman body structure includes a night lamp mechanism in contact with one of the spaceman hand structures.

17. The projection lamp structure having a spaceman model according to claim 14, wherein the magnet is fixedly supported on the supporting plate.

18. The projection lamp structure having a spaceman model according to claim 17, wherein the supporting plate is located under the magnet.

19. A projection lamp structure having a standing spaceman model, comprising a standing spaceman body structure, a spaceman head structure, and spaceman hand structures, wherein the spaceman head structure is installed at a top of the spaceman body structure, and the spaceman hand structures are installed on both sides of the spaceman body structure;

the spaceman head structure comprises a head housing, a projector mechanism is arranged inside the head housing, and the projector mechanism comprises a spherical lens, a patterned lens, and a projection lamp panel; the spherical lens is located in front of the patterned lens, and the projection lamp panel is located behind the patterned lens and a direction where a ray is emitted faces the patterned lens; corresponding protrusions are manufactured in advance on an exit surface of the patterned lens according to a pattern to be projected; and the projection lamp panel is connected to a control circuit board, the control circuit board is connected with a projection control button, the projection control button is configured to input a projection control instruction to the control circuit board, and the control circuit board drives the projection lamp panel to be turned on or off according to the projection control instruction; and a night lamp mechanism is arranged inside the spaceman body structure, the night lamp mechanism is connected to the control circuit board, the control circuit board is connected with a night lamp control button, the night lamp control button is configured to input a night lamp control instruction to the control circuit board, and the control circuit board controls the night lamp mechanism to be turned on or off according to the night lamp control instruction; and a night lamp ray outlet is formed in a front surface of the spaceman body structure, an exit portal of the night lamp mechanism corresponds to the night lamp ray outlet, and a transparent lampshade is arranged in front of the night lamp ray outlet;

wherein a backpack-shaped housing is arranged on a back surface of the spaceman body structure, the control circuit board is arranged inside the backpack-shaped housing, and all the control buttons are integrated on a button board and are installed on a back surface of the backpack-shaped housing;

wherein the night lamp mechanism includes a hollow night lamp bracket and a night lamp panel fixed inside the night lamp bracket, a back end of the night lamp bracket is connected with an interior of the backpack-shaped housing to facilitate a connection between the night lamp panel and the control circuit board, and a front end of the night lamp bracket is connected with the night lamp ray outlet; and wherein a wire ramp is further arranged in the night lamp bracket to fix a connecting line between the night lamp panel and the control circuit board; and the transparent lampshade is held by only one of the spaceman hand structures.

* * * * *